ically in conjunction with

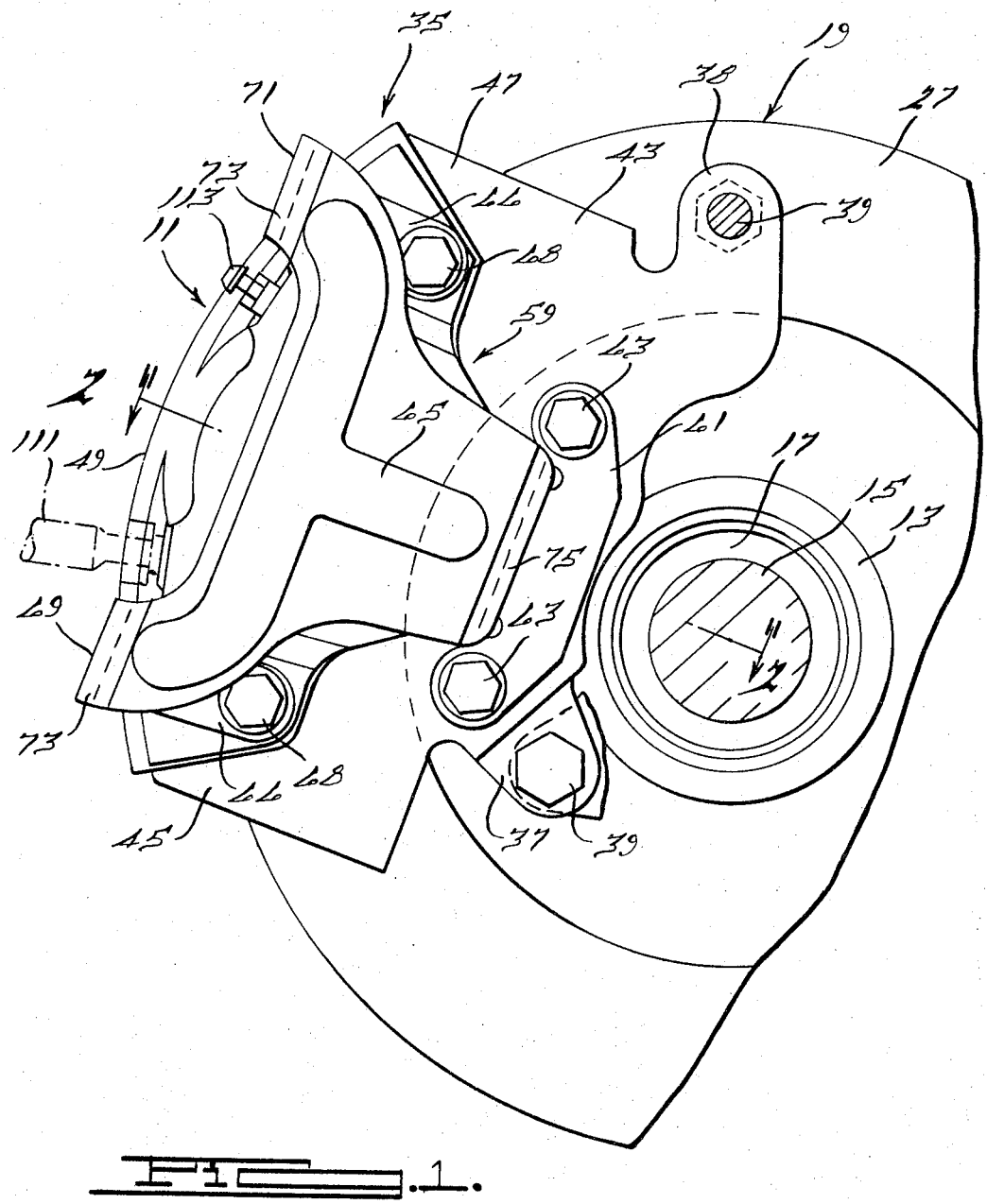

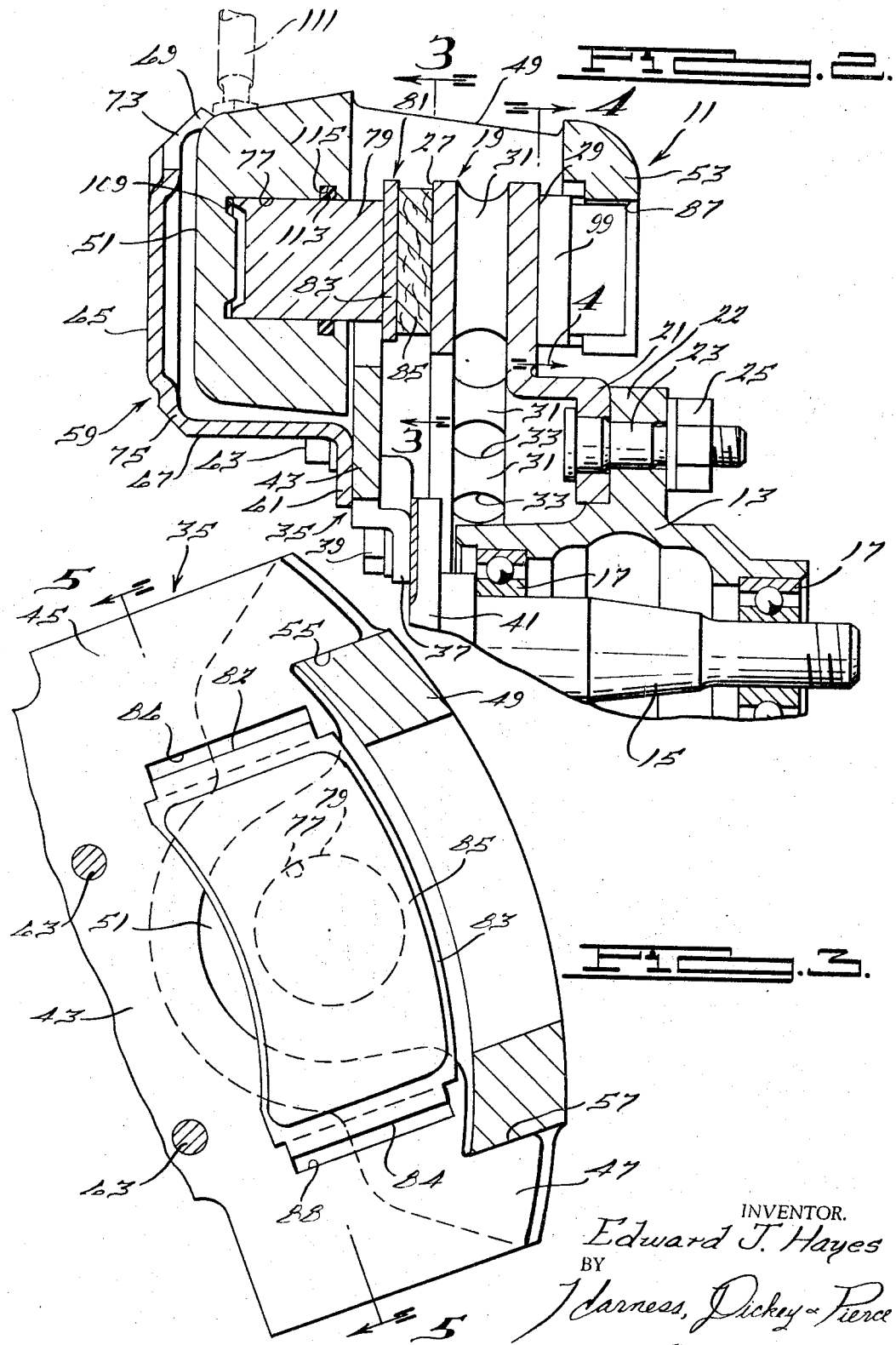

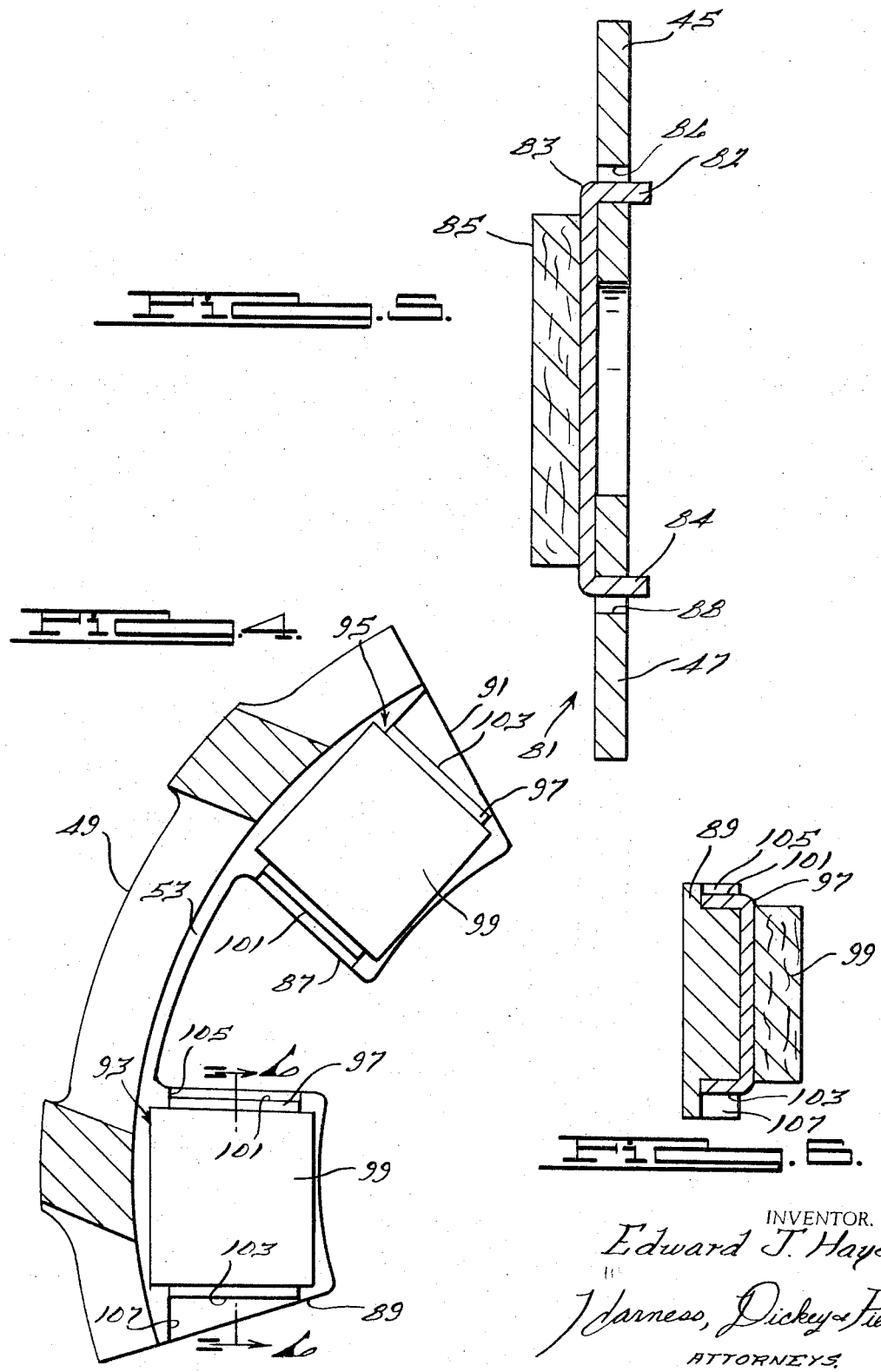

United States Patent Office 3,366,200
Patented Jan. 30, 1968

3,366,200
DISC BRAKE WITH UNITARY SINGLE BORE CALIPER
Edward J. Hayes, Livonia, Mich., assignor to Kelsey-Hayes Company, Romulus, Mich., a corporation of Delaware
Filed Mar. 11, 1966, Ser. No. 533,538
2 Claims. (Cl. 188—73)

ABSTRACT OF THE DISCLOSURE

A disc brake assembly associated with a motor vehicle for braking the rotation of a vehicle wheel. The brake assembly is of the sliding caliper type and includes a caliper housing that straddles a portion of the brake disc. A bore is formed in one part of the caliper housing to slidably support a piston. The part of the caliper housing opposite to the bore is formed with an opening that is defined at least in part by spaced leg portions. The opening facilitates direct machining of the bore and brake shoes are associated with each of the legs adjacent the opening.

---

This invention relates generally to brakes, and particularly to an improved disc brake having a unitary single bore caliper.

The brakes to which the present invention relates include those having a disc or rotor secured for rotation with a vehicle wheel. Opposed brake shoe means are nonrotatably supported relative to the rotor and are movable into frictional engagement with opposite faces thereof. A nonrotating housing or caliper has spaced legs lying on opposite sides of a rotor and has a hydraulic motor carried by one leg thereof to directly motivate one brake shoe means and press it into frictional engagement with one face of the rotor. The reaction force to motor energization moves the caliper in a direction to press the other brake shoe means associated with the other caliper leg into frictional engagement with an opposite face of the rotor to slow or stop the vehicle wheel.

Conveniently, the cylinder bore for the hydraulic motor is formed in the internal portion of one caliper leg and a piston slidable within the bore engages the first-mentioned brake shoe means. The other brake shoe means is supported and carried by the other caliper leg for movement therewith.

One of the problems arising in this construction is the difficulty of boring and machining the hydraulic cylinder bore. Thus, the caliper is desirably a unitary cast body and the opposed relation of the caliper legs is necessary to insure good operating characteristics. Specifically, the opposed caliper legs support the hydraulic motor and provide backing support for the brake shoe means on the side of the rotor opposite the motor. Such backing support insures proper contact of its adjacent brake shoe means with the rotor during braking. This has in the past made it necessary to employ offset boring and machining techniques to develop the cylinder bore. It will be appreciated that this is a relatively expensive process because of the higher cost machine tool drive train components required and, in addition, is more difficult to perform. Unitary castings are less expensive to make so that a unitary caliper having a hydraulic cylinder bore capable of being machined by using "in-line" tool and tool drive components and having satisfactory operating characteristics would be highly advantageous.

An important object of the present invention, therefore, is to provide a unitary disc brake caliper having a hydraulic cylinder bore that can be machined by the use of a standard boring bar or other "in-line" tooling and good operating characteristics.

A further object of the present invention is to provide a disc brake caliper of the above character which is relatively inexpensive to manufacture, rugged in construction and reliable in use.

Further objects and advantages of the present invention will become more apparent from a consideration of the following detailed description taken in conjunction with the drawings in which:

FIGURE 1 is an elevational view, partly in section, illustrating a typical installation of a disc brake embodying the present invention;

FIG. 2 is a sectional view of FIG. 1 taken along the line 2—2 thereof;

FIG. 3 is an enlarged sectional view of FIG. 2 taken along the line 3—3 thereof;

FIG. 4 is a sectional view of FIG. 2 taken along the line 4—4 thereof;

FIG. 5 is a sectional view of FIG. 3 taken along the line 5—5 thereof; and

FIG. 6 is a sectional view of FIG. 4 taken along the line 6—6 thereof.

Broadly described, the present invention includes a movable unitary housing having spaced legs lying on opposite sides of a rotor secured for rotation with a vehicle wheel, a blind cylinder bore formed in one of said legs, said bore being open on the side of said one leg adjacent the rotor and being closed by the material of said housing on its opposite side, and opening in the other leg of said housing aligned with said bore and allowing free passage of boring and machine tools therethrough directly to said bore, said other leg having a pair of friction means, one on either side of said opening.

Referring now more specifically to the drawings, a disc brake embodying the present invention is illustrated generally at 11 in FIGS. 1 and 2 and is shown associated with a vehicle wheel assembly having a hub 13 rotatably supported on a stationary wheel spindle 15 by bearings 17 and to which hub a conventional wheel rim (not shown) is adapted to be secured. A brake rotor or disc 19 is provided with an attaching flange 21 secured to a flange 22 on the hub 13 by bolts 23 and nuts 25 and has a pair of oppositely disposed brake shoe engaging radial faces 27, 29. A plurality of radially extending openings 33 are formed in the rotor 19 and are angularly spaced apart by webs 31. The webs 31 serve as fan blades to move cooling air outwardly through the openings 33 during turning movement of the rotor 19.

A torque member or spider 35 is provided with a pair of flange-like projections 37, 38 adapted to be fixed by screws 39 to a steering knuckle assembly (not shown) nonrotatably supported by the spindle 15 through a conventional king pin arrangement (not shown) when the disc brake is associated with a vehicle front wheel. In the rear wheel version, the spider 35 may have flange means secured directly to a flange 41 integral with the stationary wheel spindle 15. The spider 35 has a web 43 offset from the projections 37, 38 and provided with a spaced pair of outwardly extending torque arms 45, 47 integral therewith.

A generally C-shaped housing or caliper 49 is provided with generally opposed legs 51, 53 disposed in spaced confronting relation to arcuate portions of the rotor faces 27, 29 and is snugly but slidably received between inwardly facing flanges 55, 57 formed on the torque arms 45, 47, respectively. A flexible strap 59 has an inner radial flange 61 fixed by screws 63 to the torque web 43. An angularly offset arm 65 is interconnected with the strap flange 61 by a web 67 and has a pair of spring fingers 69, 71 extending inwardly from the upper end of the arm 65 and forming an acute angle therewith. The fingers 69, 71 each has a terminal portion 66 fixed to the caliper 49 by screws 68. The strap 59 has reduced thickness areas at 73, 75 forming fulcrum points about which the strap fingers 69, 71 and arm 65 flex when the caliper 49 moves transverse to the rotor 19 as will be hereinafter described.

The caliper leg 51 carries a hydraulic motor including a cylinder bore 77 formed in the leg 51 and slidably receiving a piston 79. The outer end of the piston 79 is positioned to engage a backing plate 83 of a brake shoe 81. Brake lining 85 is riveted or bonded to the plate 83 in the usual manner so that when the piston 79 moves toward the right, as seen in FIG. 2, the brake lining 85 is pressed into frictional engagement with the face 27 of the rotor 19. The backing plate 83 has a right angle flange 82, 84 at either end thereof slidably received in slots 86, 88 formed in the torque arms 45, 47, respectively.

The caliper leg 53 is centrally apertured at 87 forming a pair of dependent legs 89, 91. A pair of substantially identical brake shoes 93, 95 each has a backing plate 97 to which brake lining 99 is riveted or bonded in the usual manner. The surface area of the linings 99 together equal the surface area of the lining 85 and the backing plates 97 are each provided with a pair of right angle flanges 101, 103 positioned in spaced recesses 105, 107 formed in each of the legs 89, 91 (FIGS. 4 and 6).

When the piston 79 moves toward the right to move the brake shoe 81 toward the rotor surface 27 as described above, it does so under the force of pressurized fluid admitted to the cylinder bore 77 behind the piston 79. The reaction fluid pressure acts on the caliper leg 51 and biases the caliper 49 toward the left as seen in FIG. 2. The strap fingers 69, 71 and arm 65 act like a spring to bias the caliper 49 toward the left as seen in FIG. 2 and normally hold the brake linings 99 in light contact with the rotor face 29. When the hydraulic motor is pressurized, the biasing force on the caliper 49 presses the brake linings 99 into tight frictional engagement with the rotor face 29 and the vehicle wheel associated therewith is slowed or stopped. During this slight caliper movement, the strap fingers 69, 71 and arm 65 flex slightly about the fulcrum areas 73, 75 relieving some of the spring force thereon and this conjoint flexure about the areas 73, 75 insures that the caliper 49 moves along a straight line normal to the rotor faces 27, 29. When the pressure in the cylinder bore 77 is released, the caliper 49 is held with the linings 99 in light engagement with the rotor face 29 under the spring force of the strap 59. A description of this strap 59 and its operation is set out in detail in the copending application Serial No. 541,732, filed April 11, 1966 and owned by the assignee of the present application.

According to the present invention, the aperture 87 is sized equal to or greater than the cylinder bore 77. This permits easy boring and machining of the cylinder bore 77 since in-line machine tool and drive train components can be employed. Furthermore, the desirable unitary cast construction for the caliper 49, which is highly advantageous, is retained and the brake shoes 93, 95 are solidly backed over the entire area by the cast caliper legs 89, 91 to insure proper contact between the linings 99 and the rotor face 29.

In use, the brake shoes 81, 93, 95 are energized by delivering pressurized fluid to the cylinder bore 77 through a port 109 in the housing 49 from a master cylinder (not shown), such as by applying a conventional vehicle brake pedal (not shown) from within the vehicle. The master cylinder (not shown) is connected to the port 109 by a conduit 111 so that upon delivery of pressurized fluid admitted to the cylinder bore 77, the piston 79 moves toward the right, as seen in FIG. 3, and forces the lining 85 of the brake shoe 81 into frictional engagement with the face 27 of the rotor 19. The reaction force to this fluid pressure biases the caliper 49 to the left and the linings 99 of the brake shoes 93, 95 into tight frictional engagement with the face 29 on the other side of the rotor 19.

When the brake shoes 81 and 93, 95 frictionally engage the faces 27, 29 of the rotor 19, the torque forces on the shoes are transmitted to the torque spider 35 by one of the right-angle flanges 82, 84 of the brake shoe 81 and to the caliper 49 by one set of the right-angle flanges 101, 103 of the brake shoes 93, 95, depending on the direction the rotor 19 is turning. The caliper 49 is seated against the reaction faces 55, 57 of the spider torque arms 45, 47 so that the integrity of the caliper 49 and the shoes 81, 93, 95 is maintained and braking torque reacted without imposed forces on the sliding faces of the piston 79 and cylinder bore 77.

When fluid pressure to the cylinder bore 77 is released, the piston 79 returns toward the left as seen in FIG. 2 under the force of a rectangular cross-sectional annular seal 113 carried in an annular groove 115 in the cylinder bore 77. This seal 113 is twisted or distorted when the piston 79 is moved toward the right and springs back when fluid pressure is released to move the piston 79 back toward the left. Also, released of the pressure to the cylinder bore 77 permits the caliper housing 49 to move back to its original position where it is held by the strap 59 with the brake linings 99 in light contact with the rotor face 29. A fluid connection 113 is provided to the cylinder bore 77 for bleeding the hydraulic system in the usual manner.

By the foregoing, there has been described an improved disc brake calculated to fulfill the inventive objects set forth and while a preferred embodiment of the invention has been illustrated and described above in detail, various additions, substitutions, modifications and omissions may be made thereto without departing from the spirit of the invention as encompassed by the appended claims.

What is claimed is:

1. A disc brake comprising a movable unitary housing having spaced legs lying on opposite sides of a rotor secured for rotation with a vehicle wheel, a blind cylinder bore formed in one of said legs, said bore being opened on the side of said one leg adjacent the rotor and the other of said legs and being closed by the material of said housing on its opposite side, a piston slidably supported in said cylinder bore, a first brake shoe associated with said piston and adapted to frictionally engage the rotor upon actuation of said piston, an opening in the other leg of said housing aligned with said bore, said opening being defined by a pair of spaced apart portions and being at least as large as said cylinder bore for allowing free passage of boring and machining tools therethrough directly to said cylinder bore, and second and third brake shoes associated with respective of said portions of said other leg on opposite sides of said opening, each of said second and third brake shoes being comprised of a brake lining and a respective backing plate, each of said backing plates being generally flat with right angle flanges at either end thereof, the respective of said portions of said other leg having spaced recesses therein receiving the respective of said right angle flanges of said backing plates for precluding rotation of said second and third brake shoes relative to said other leg.

2. A disc brake as set forth in claim 1 wherein the surface area of the brake lining of the first brake shoe is substantially equal to the combined area of the brake linings of the second and third brake shoes.

References Cited

UNITED STATES PATENTS

| | | | |
|---|---|---|---|
| 2,655,229 | 10/1953 | Eksergian | 188—73 X |
| 3,134,459 | 5/1964 | Burnett et al. | 188—73 |
| 3,166,159 | 1/1965 | Burnett | 188—73 |
| 3,213,969 | 10/1965 | Rosanowski | 188—73 |

FOREIGN PATENTS 938,978  10/1963  Great Britain.

MILTON BUCHLER, *Primary Examiner.*

G. E. HALVOSA, *Assistant Examiner.*